April 14, 1964  J. M. GRUBER ETAL  3,129,417
INDICATOR SYSTEMS FOR USE IN THRUST BEARINGS
HAVING RESONANCE CHANGER PISTONS
Filed Nov. 13, 1962  3 Sheets-Sheet 1

INVENTORS
Jerome M. Gruber
Willis W. Gardner
BY
Morsell & Morsell
Attorneys

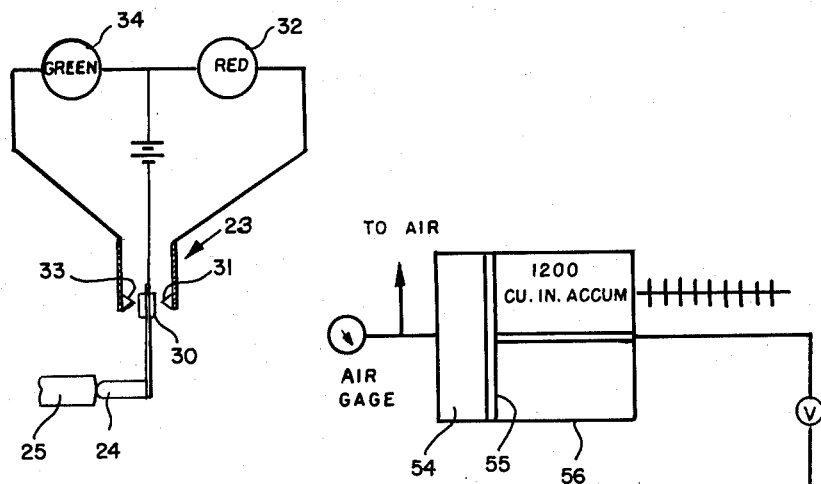
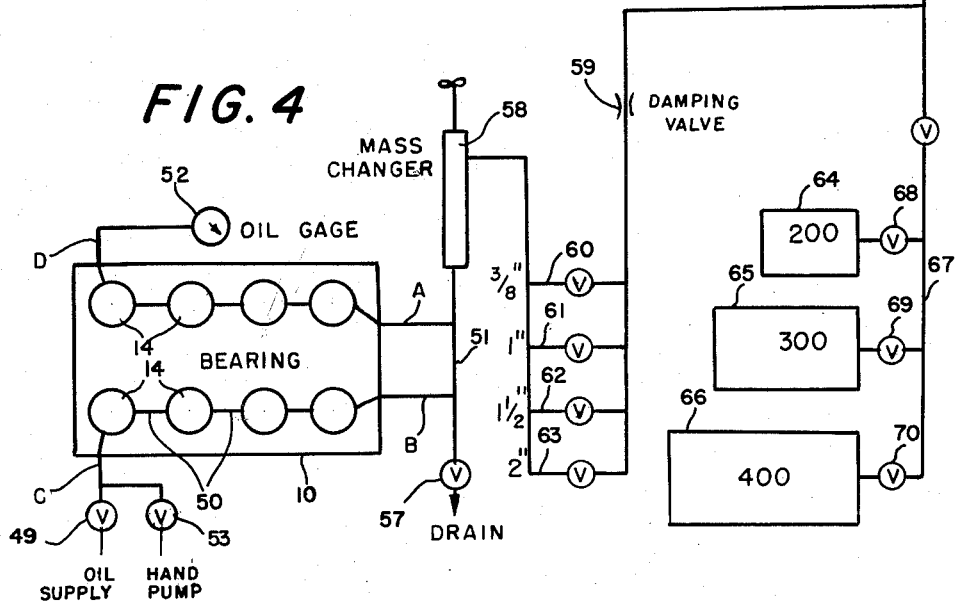

April 14, 1964  J. M. GRUBER ETAL  3,129,417
INDICATOR SYSTEMS FOR USE IN THRUST BEARINGS
HAVING RESONANCE CHANGER PISTONS
Filed Nov. 13, 1962  3 Sheets-Sheet 3
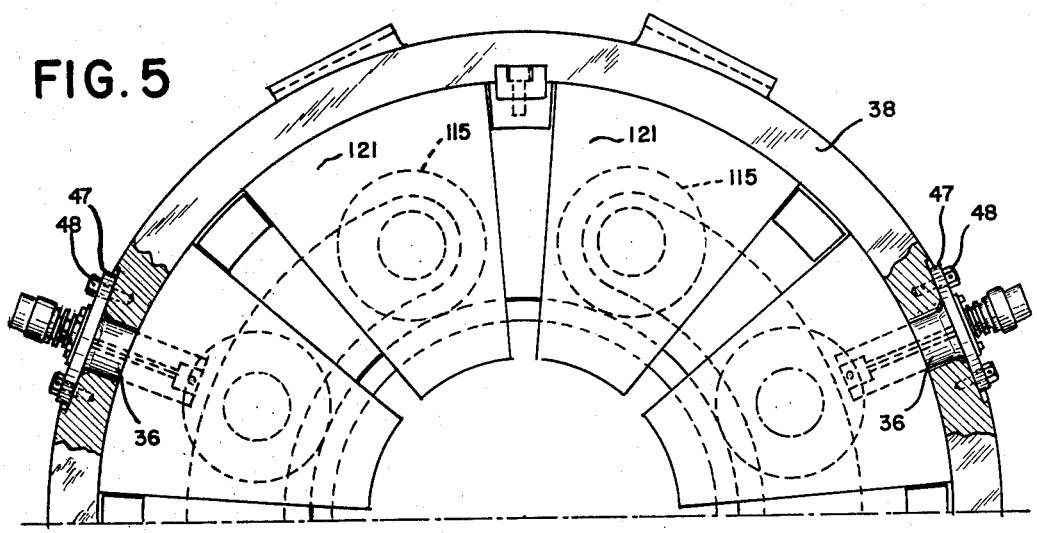
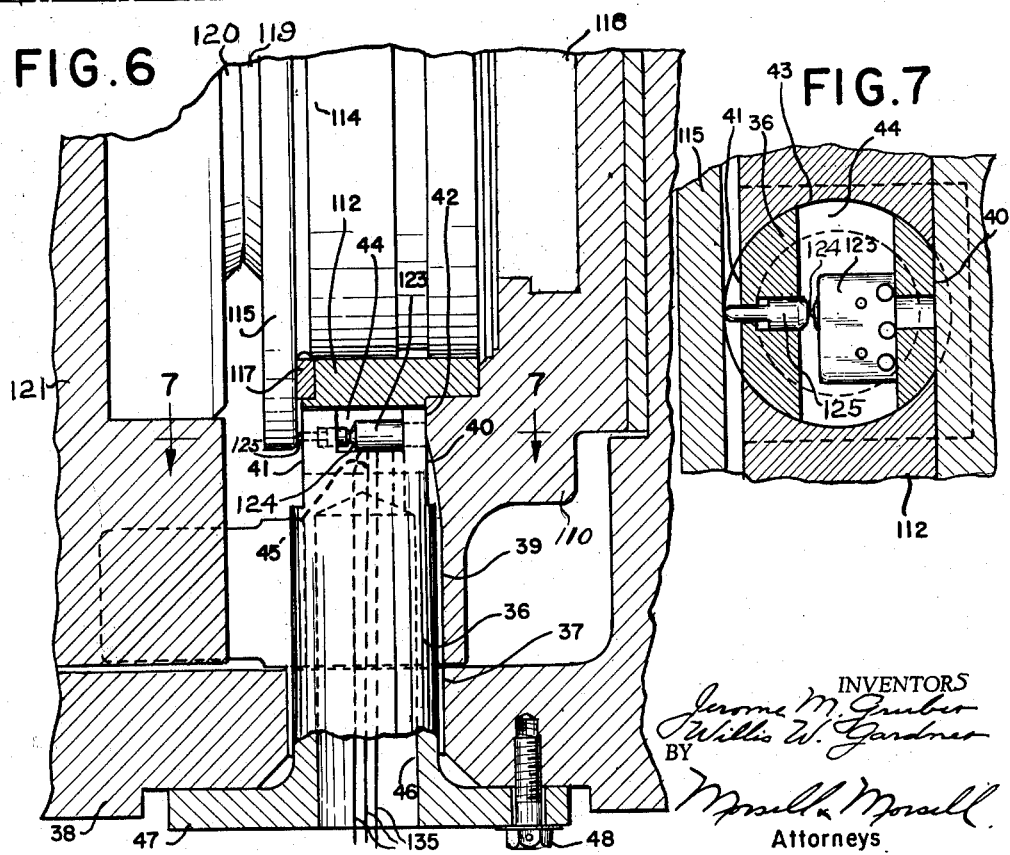
INVENTORS
Jerome M. Gruber
Willis W. Gardner
BY
Morsell & Morsell
Attorneys

United States Patent Office 3,129,417
Patented Apr. 14, 1964

3,129,417
INDICATOR SYSTEMS FOR USE IN THRUST BEARINGS HAVING RESONANCE CHANGER PISTONS
Jerome M. Gruber, Waukesha, and Willis W. Gardner, New Berlin, Wis., assignors to Waukesha Bearings Corporation, Waukesha, Wis., a corporation of Wisconsin
Filed Nov. 13, 1962, Ser. No. 237,008
5 Claims. (Cl. 340—282)

This invention relates to improvements in indicator systems for use in thrust bearings having resonance changer pistons.

In certain types of thrust bearings there are hydraulic pistons mounted in bushings in the base ring, which pistons are actuated hydraulically, through suitable external means to bring the pistons to a floating position for the purpose of adjusting or changing the resonance frequency of the shaft system to a point where noise and vibration are minimized. When a ship is under way, the velocity of the water flowing through the propeller varies. As the blades of the propeller encounter these areas of higher and lower velocity, the thrust imparted by the blades to the shaft fluctuates in magnitude. These thrust variations cause the shaft to vibrate longitudinally and these variations are transmitted through the shaft collar, bearing shoes, and thrust bearing housing to the ship's hull. If the forcing frequency coincides with one of the natural longitudinal frequencies of the ship, vibration magnitudes are at a maximum. The purpose of a resonance changer is to control the amplitudes of the longitudinal hull vibrations by altering the natural frequency of the propulsion system and by absorbing part of the force transmitted to the hull. This is accomplished by use of the adjustable hydraulic pistons between the base ring and the shoes of the thrust bearing. In the use of thrust bearings with hydraulic pistons as above described, in order to have the hydraulic cushioning effective, the piston heads must be moved away from a "hard-down" position, i.e., the piston heads must be in a floating condition.

Heretofore, the only way of determining when the pistons were hard-down was through the use of a complicated lever and ring gear arrangement which acted on the circular shims in contact with the lower faces of the pistons to attempt to rotate the shims. If there was resistance to this rotation, the pistons were hard-down. If, on the other hand, the shims could be rotated, the pistons were floating.

It is a general object of the present invention to provide a simple and effective means of indicating whether or not the pistons in a thrust bearing of the class described are floating, said indicating mechanism being effective at a remote point such as in a control room of a ship.

A more specific object of the present invention is to provide an indicator system as above described which includes "Micro-switches" arranged adjacent the piston heads in such a manner as to control remote signals which indicate to an observer whether or not the pistons are floating.

A further, more specific object, is to provide in one embodiment of the invention means whereby the "Micro-switches" are part of a readily removable probe assembly which can be removed from the periphery of the bearing housing at any time desired without disassembling the thrust bearing. In this way, "Micro-switches" may be readily replaced when defective, or may be easily examined.

A further object of the last-mentioned embodiment of the invention is to provide a readily removable probe assembly which may bear data to aid in proper installation of a new "Micro-switch."

With the above and other objects in view, the invention consists of the improved indicator system for thrust bearings having hydraulic pistons, and all of its parts and combinations, as set forth in the claim, and all equivalents thereof.

In the accompanying drawings, illustrating two different embodiments of the invention, in which the same reference numerals designate the same parts in all of the views:

FIG. 3 is a wiring diagram for the indicator system;

FIG. 4 is a diagrammatic view showing a typical resonance changer system which may be used in conjunction with the hydraulic pistons;

FIG. 5 is a fragmentary plan view of the interior of a thrust bearing looking at the shoes and base ring and showing a modified form of the invention, parts being broken away and shown in section;

FIG. 6 is a fragmentary sectional view of the embodiment of FIG. 5, taken similarly to FIG. 2; and FIG. 7 is a fragmentary sectional view taken on the line 7—7 of FIG. 6.

Figure 1:
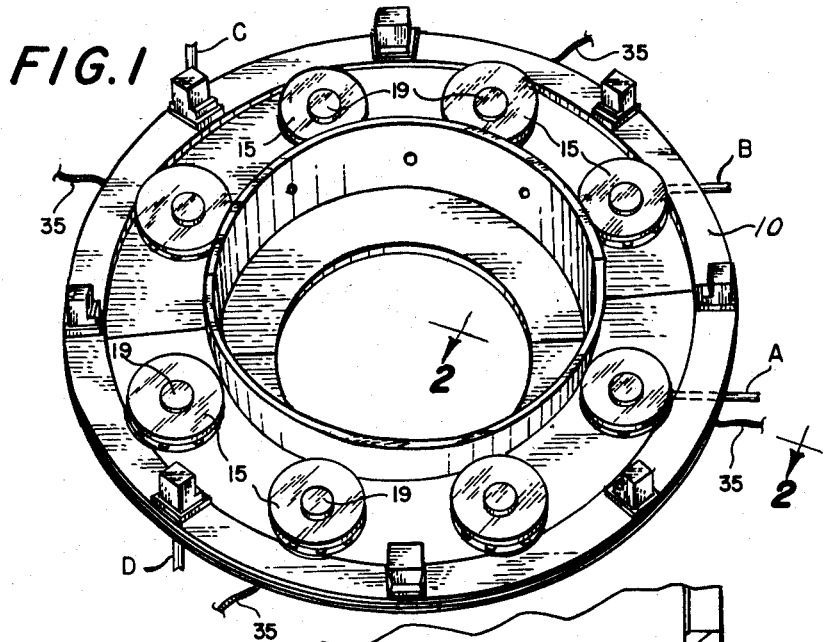
FIG. 1 is a perspective view of an interior portion of one side of a thrust bearing of the self-leveling type showing the base ring and pistons thereon.
Figure 2:
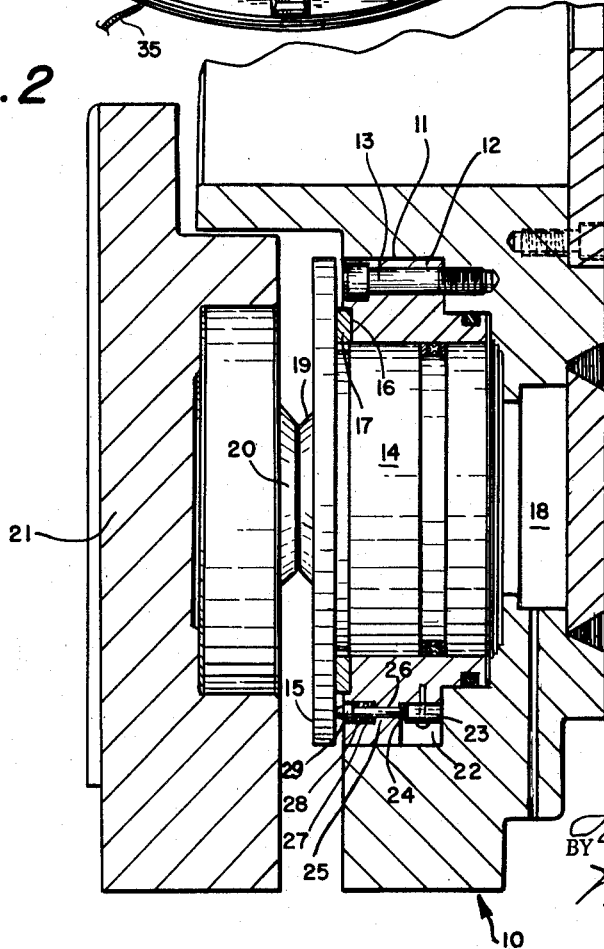
FIG. 2 is a sectional view taken approximately on the line 2—2 of FIG. 1, also showing a shoe in cooperating position.

Referring more particularly to FIGS. 1 and 2, the thrust bearing is of the well known self-leveling type which includes a base ring 10 having a plurality of recesses 11, one for each shoe 21 in the thrust bearing. Each recess 11 receives a circular bushing 12, the bushings being removably held in place by bolts 13. Slidable within each bushing is a hydraulic piston 14 having an external head 15 which is of a diameter to project over the bushing, as illustrated in FIG. 2. Each bushing has an end annular recess 16 for accommodating a ring-shaped shim 17. Below each piston the base ring is formed with a hydraulic chamber 18 for the reception of hydraulic fluid which is to act on the inner end of the piston. In an eight shoe thrust bearing, as is illustrated in FIG. 1, the hydraulic chambers for the four pistons on the upper half of FIG. 1 may be inter-connected so that hydraulic fluid under pressure supplied through an inlet C will be communicated to all four pistons on the upper half of FIG. 1. Similarly, hydraulic fluid admitted through an inlet A will affect all of the four pistons on the lower half of FIG. 1 (see also FIG. 4). The outer surfaces of the piston heads are formed with contact buttons 19 for coaction with buttons 20 on the shoes 21.

The material just described is not new, but is common to thrust bearings of the type having resonance changing pistons therein.

Each bushing 12 has a peripheral recess 22 for accommodating an electric switch such as a "Micro-switch" 23. The "Micro-switch" has a button 24 which is engaged by one end of a plunger 25, slidable in a transverse bore 26 in the bushing. A larger counterbore 27 accommodates a coil spring 28 which is confined between the inner end of the counterbore and a collar 29 on the plunger. The exterior end of the plunger projects beyond the collar as illustrated.

When the head 15 of the piston is hard-down on the shim 17 as in FIG. 2 it is, of course, not floating and the action of the pistons is ineffective. When the piston is hard-down as illustrated in FIG. 2, the pressure of the head 15, against the force of the spring 28, on the end of the plunger 25 holds the "Micro-switch" in a condition where its contact 30 (see FIG. 3) is in engagement with a normally open switch contact 31 to cause a red light 32 located on an indicator board at some remote point in a control room to be illuminated. When the piston is floating, the contact 30 is in engagement with contact 33 to cause the green light 34 to be illuminated and the red light to be out, the red light contact 31 being normally open, and the green light contact being normally closed. Thus, a glance at the indicator board will readily disclose whether or not the pistons are floating. This will enable the attendant to readily operate the resonance changer system of FIG. 4 in a manner to obtain the best results and a minimum of vibration. Heretofore, it has been necessary to manually operate a lever coacting with a ring gear to try to rotate the shims 17. This involved very complicated mechanism. If the shims could not be rotated with the old method the piston was hard-down. If the shims could be rotated, then the piston was floating. The present method makes it possible to obtain the same information by merely glacing at a control board.

It has been found effective to use a "Microswitch" for every other shoe, as shown in FIG. 1, where it is noted that the "Microswitch" wires 35 project from the region of every other shoe.

In the form of the invention of FIGS. 5, 6 and 7, the "Micro-switches" and associated parts are designated by the same numerals used in FIG. 1 preceded by the digit "1," and these parts will therefore not be described. In the form of the invention of FIG. 1 the "Micro-switches" or like electric switches are connected to the bushings 12. In the embodiment of FIGS. 5, 6 and 7, the "Micro-switches" are arranged to be similarly located in assembly but are actually carried by separate probe members 36. These probe members are inserted in holes 37 which extend radially through a surrounding thrust bearing housing portion 38 and also through an opening 39 in the base ring 110. The probe has its inner end formed with outwardly-disposed flats 40 and 41, the flat 40 fitting against flat portion 42 of the base ring and the entire inner end being received in a hole 43 in the bushing 112, which hole is shaped to receive and position said inner end, as is clear from FIG. 7.

The inner end of the probe is slotted across its diameter as at 44 and the "Micro-switch" 123 is accommodated in the slot. The electric wires 135 may extend from the "Micro-switch" through a small bore 45, into the main bore 46 of the probe, and then out to the exterior.

Each probe has a head 47 which is removably held in position by bolts 48 as shown in FIG. 6.

When it is desired to check or replace a "Micro-switch," with the form of the invention shown in FIGS 5, 6 and 7, it is merely necessary to remove the bolts 48 and withdraw the probe. The "Microswitch" will, of course, come out with the probe. With this arrangement the probe, at the time of original assembly in the bushing, may have material attached thereon which will aid in the proper installation of a new "Microswitch" at any time. In this way, proper effective plunger length, and other critical relationships, may be ensured in the new installation. Due to the flats at 40 and 41 and the relatively close fit of the inner end of the probe with the bushings 112, the probe, when reassembled, will always come in the proper position to bring the "Microswitch" and its plunger into proper position.

*Operation*

In operation of either form of the invention the pistons 14 or 114 normally hold the thrust bearing shoes 21 or 121 against the collar on the driven shaft with a force that is directly proportional to the pressure in the system. When it is desired to make a resonance change in the system it is necessary to check to see whether the piston heads 15 or 115 are free to move, i.e., whether they are floating. If the pistons are hard-down against the shims 17 or 117, the red light 32 will be on on the indicator board indicating that the pressure in the resonance changing system of FIG. 4 must be adjusted. It is not claimed that the system of FIG. 4 forms a novel element of the present invention. It has, however, been illustrated diagrammatically to show the background in connection with the usage of the present indicator system. Referring to FIG. 4, the thrust bearing 10 (or 110) has been illustrated diagrammatically with the eight pistons 14 (or 114). Oil pressure in the resonance changing system is provided from a suitable source under pressure, as shown in FIG. 4, under control of a valve 49 which admits oil under pressure into the inlet conduit C (also shown in FIG. 1) leading to one-half of the piston bushings, there being connecting lines 50. This pressure is then communicated through line B (also shown in FIG. 1), and through conduit 51 with inlet line A for the other half of the thrust bearing, as shown in FIG. 4, the outlet line D leading to an oil gauge 52, which gauge is provided for observation of the pressure. Oil pressure may be provided by a hand pump when valve 53 is opened, or by air pressure in the space 54 on one side of a piston 55 in an accumulator 56. The system is filled with oil at a pressure necessary to maintain the piston heads in floating condition. The pressure may be adjusted by the hand pump and by the drain valve 57 shown in FIG. 4. There may also be a mass changer 58, a damping valve 59, a plurality of parallel conduits 60, 61, 62 and 63, each of a different diameter as indicated and controlled by a valve, and there are extra oil flasks 64, 65 and 66 from which flow to the conduit 67 may be controlled by valves 68, 69 and 70, respectively. With this arrangement, and by opening a selected one of the valves 68, 69 or 70 and a selected one of the lines 60–63, the pressure in the system may be readily adjusted to absorb pressure changes and prevent vibrating forces acting on the shaft system from being transmitted to the hull. The springiness of the system can be changed by varying the oil volume, by opening additional ones of the flasks 64, 65 and 66, or by changing the air volume in 54.

It is apparent, therefore, that the improved indicating system provides a simple indicator which may be located at a remote control panel, for readily indicating whether the pistons are hard-down or floating, and for thus indicating when it is necesary to adjust a resonance changer of the type shown in FIG. 4.

Various changes or modifications may be made without departing from the spirit of the invention, and all of such changes are contemplated as may come within the scope of the claims.

What we claim is:

1. In a thrust bearing of the resonance changer type having a plurality of shoes adapted to receive thrust and having a base ring with pistons which are provided with heads to which thrust is transmitted from said shoes, and there being fluid pressure means for adjusting said pistons from a hard-down position to a floating position, an electric switch confined in said thrust bearing base ring and having a movable plunger with an end projecting from the base ring and positioned to be actuated by a piston head in response to movement of the latter, an electric circuit for said switch having an externally extending portion, an electric signal in said external portion of said circuit for indicating when said piston is hard-down, and an electric signal in said external portion of said circuit for indicating when said piston is floating.

2. In a thrust bearing of the resonance changer type having a plurality of shoes adapted to receive thrust and having a base ring with bushings in which pistons are slidable, said pistons being of the type which are provided with heads to which thrust is transmitted from said shoes and there being fluid pressure means for adjusting said pistons from a hard-down position to a floating position, indicator means including an actuating part positioned in one of said bushings adjacent a piston and having a plunger with an end projecting movably beyond the base ring and bushing and positioned to be actuated by said piston head and said indicator means including a remotely positioned member connected to said actuating part for indicating said piston position.

3. In a thrust bearing of the resonance changer type having a plurality of shoes adapted to receive thrust and having a base ring with pistons which are provided with heads to which thrust is transmitted from said shoes, and there being fluid pressure means for adjusting said pistons from a hard-down position to a floating position, a probe member removably positioned in the periphery of said base ring and extending radially of a piston, an electric switch carried by the inner end of said probe member adjacent said piston for removability with said probe member and having a movable plunger with an end projecting beyond the base ring and positioned to be actuated by said piston head in response to movement thereof, an electric circuit for said switch including conductors extending through said probe member to the exterior, and an external electric indicator in said circuit for indicating said piston position.

4. In a thrust bearing of the resonance changer type having a plurality of shoes adapted to receive thrust and having a base ring with bushings in which pistons are slidable, said pistons being of the type which are provided with heads to which thrust is transmitted from said shoes and there being fluid pressure means for adjusting said pistons from a hard-down position to a floating position, a probe member removably positioned in the periphery of said base ring and having an inner end projecting radially into one of said bushings, an electric switch carried by said inner end adjacent said piston for removability with said probe member and having a movable plunger with an end projecting beyond the base ring and positioned to be actuated by said piston head in response to movement thereof, an electric circuit for said switch having a portion extending externally through said probe member, and means including an externally accessible indicator in said external portion of the circuit for indicating said piston position.

5. In a thrust bearing of the resonance changer type having a plurality of shoes adapted to receive thrust, and having a base ring with bushings in which pistons are slidable, said pistons being of the type which are provided with heads to which thrust is transmitted from said shoes and there being fluid pressure means for adjusting said pistons from a hard-down position to a floating position, a probe member removably positioned in the periphery of said base ring and having an inner end projecting into one of said bushings, said bushing having a peripheral opening to receive said end, an electric switch carried by said inner end of the probe member in a position to be actuated by a piston in response to movement thereof, an electric circuit for said switch having a portion extending externally through said probe member, and means including an externally accessible indicator in said external portion of the circuit for indicating said piston position, the inner end of said probe member and the peripheral opening in said bushing being shaped to coact in ensuring proper position of said switch relative to said piston.

References Cited in the file of this patent

UNITED STATES PATENTS

| | | |
|---|---|---|
| 1,340,355 | Wood | May 18, 1920 |
| 2,091,207 | Kingsbury | Aug. 24, 1937 |
| 2,876,443 | Honeyman | Mar. 3, 1959 |
| 3,027,553 | Sandor | Mar. 27, 1962 |

FOREIGN PATENTS

| | | |
|---|---|---|
| 213,159 | Austria | June 15, 1960 |